United States Patent
Siler et al.

(10) Patent No.: US 6,582,000 B1
(45) Date of Patent: Jun. 24, 2003

(54) MONOLITHIC TRIM PANEL WITH INTEGRATED SPEAKER GRILL

(75) Inventors: Steven R. Siler, Fort Wayne, IN (US); Robert L. Cochran, Fort Wayne, IN (US); Kurt A. Ringger, Blufton, IN (US); Michael L. Noll, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/059,788

(22) Filed: Jan. 29, 2002

(51) Int. Cl.[7] ............................................... B62D 27/02
(52) U.S. Cl. ..................... 296/29; 296/190.08; 296/208
(58) Field of Search ............................. 296/29, 37.13, 296/190.01, 190.08, 191, 208

(56) References Cited

U.S. PATENT DOCUMENTS

| | | | | |
|---|---|---|---|---|
| 1,745,352 A | * | 2/1930 | Blanch | 296/185 |
| 1,860,224 A | * | 5/1932 | Bode | 220/477 |
| 5,769,486 A | * | 6/1998 | Novoa et al. | 296/210 |
| 5,820,191 A | | 10/1998 | Blakewood, Jr. et al. | 296/37.13 |
| 5,919,544 A | | 7/1999 | Terajima | 428/116 |
| 6,106,045 A | * | 8/2000 | Gac et al. | 296/39.1 |
| 6,113,172 A | * | 9/2000 | Chaloult et al. | 296/26.08 |
| 6,196,606 B1 | * | 3/2001 | McGoldrick | 296/37.13 |
| 6,258,438 B1 | * | 7/2001 | Loveland et al. | 428/137 |
| 6,286,897 B1 | * | 9/2001 | Ruhter et al. | 296/190.01 |
| 6,318,797 B1 | * | 11/2001 | Bohm et al. | 296/210 |

* cited by examiner

Primary Examiner—D. Glenn Dayoan
Assistant Examiner—Paul Chenevert
(74) Attorney, Agent, or Firm—Jeffrey P. Calfa; Neil T. Powell; Dennis Kelly Sullivan

(57) ABSTRACT

A molded product has a main body formed of a monolithic sheet of thermoplastic. The thermoplastic sheet has side and back sections extending horizontally at substantially right angles to one another and define an upright orientation of the molded product. The side and back sections are connected to a central vertical spine between the side and back sections. An intermediate angled section interrupts the vertical spine and located between the side and back sections. Front and rear major surfaces cover the main body. A plurality of apertures through the intermediate angled section connecting the front and rear major surfaces and serve as an integral speaker grill.

6 Claims, 6 Drawing Sheets

MONOLITHIC TRIM PANEL WITH INTEGRATED SPEAKER GRILL

BACKGROUND OF THE INVENTION

1. Field of the Invention

The present invention relates to molded interior panels for vehicle passenger cabins and more particularly relates to a monolithic panel and speaker grill cover for cabin pillars.

2. Description of the Problem

Vehicle interior panels have been conventionally formed from composite molded products, in which skin and base members are molded integrally, or from monolithic thermoplastic materials, which can be given a textured surface of pleasing appearance. Vehicle cabin comfort and ambiance has been further enhanced by providing advanced sound systems using speakers of differing frequency response characteristics distributed around the cabin. Conventionally, the speakers are located behind the panels, and the panels have been adapted to accommodate the speakers by forming openings for the speakers, and then covering the speakers with a separate grill. Forming grills and panels separately poses problems in color matching and in assuring a good fit between the different components. It also requires separate molds for the panel and the grill.

SUMMARY OF THE INVENTION

According to the invention there is provided a molded product having a main body formed of a monolithic sheet of thermoplastic. The thermoplastic sheet has side and back sections extending horizontally at substantially right angles to one another and define an upright orientation of the molded product. The side and back sections are connected to a central vertical spine between the side and back sections. An intermediate angled section interrupts the vertical spine and is located between the side and back sections. Front and rear major surfaces cover the main body. A plurality of apertures through the intermediate angled section connecting the front and rear major surfaces and serve as an integral speaker grill.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
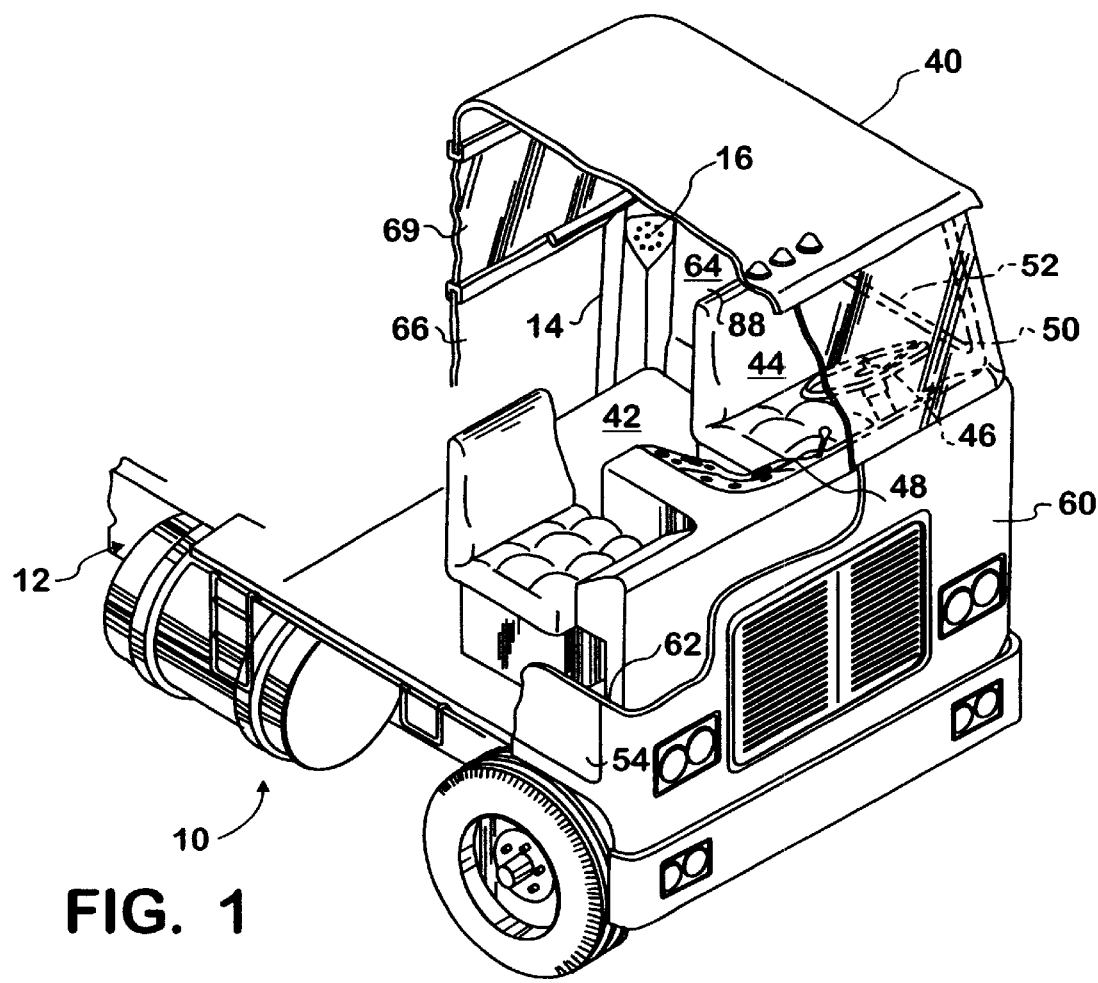
FIG. 1 is a perspective view of a truck including an operator cab in partial cutaway to show details of the cab interior.

Referring to FIG. 1, a truck 10 includes a cab 40, disposed on a chassis 12. Cab 40 forms an enclosure defining an operator's compartment 42. Compartment 42 includes a driver's seat 44, a steering wheel 46 and an instrument panel 48, which may include components and controls for a vehicle stereo system. Cab 40 is provided with a windshield 50, a left side access door 52 and a right side access door 54.

The details of the construction of cab 40 may vary, but will include sidewalls including a front wall 60, parallel sidewalls 62 and 64 and a rear wall 66. Rear wall 66 is broken by a large backlight 69. Cab 40 may be constructed conventionally from steel framing elements and inner and outer sheet metal, fiberglass or reinforced plastic skin elements. Inner panels such as a monolithic corner panel element 14 are used to line the interior of operator's compartment 42. These panels can provide sound and thermal insulation, cover sharp or protruding objects, and in general provide occupants of compartment 42 with a more relaxing setting than bare metal walls would. Monolithic corner panel element 14 has an inward facing surface contoured to fit into a corner of compartment 42 an includes an area located over a speaker which is pierced by a plurality of speaker holes 16 to allow sound to pass unfettered from the speaker.

Figure 2:
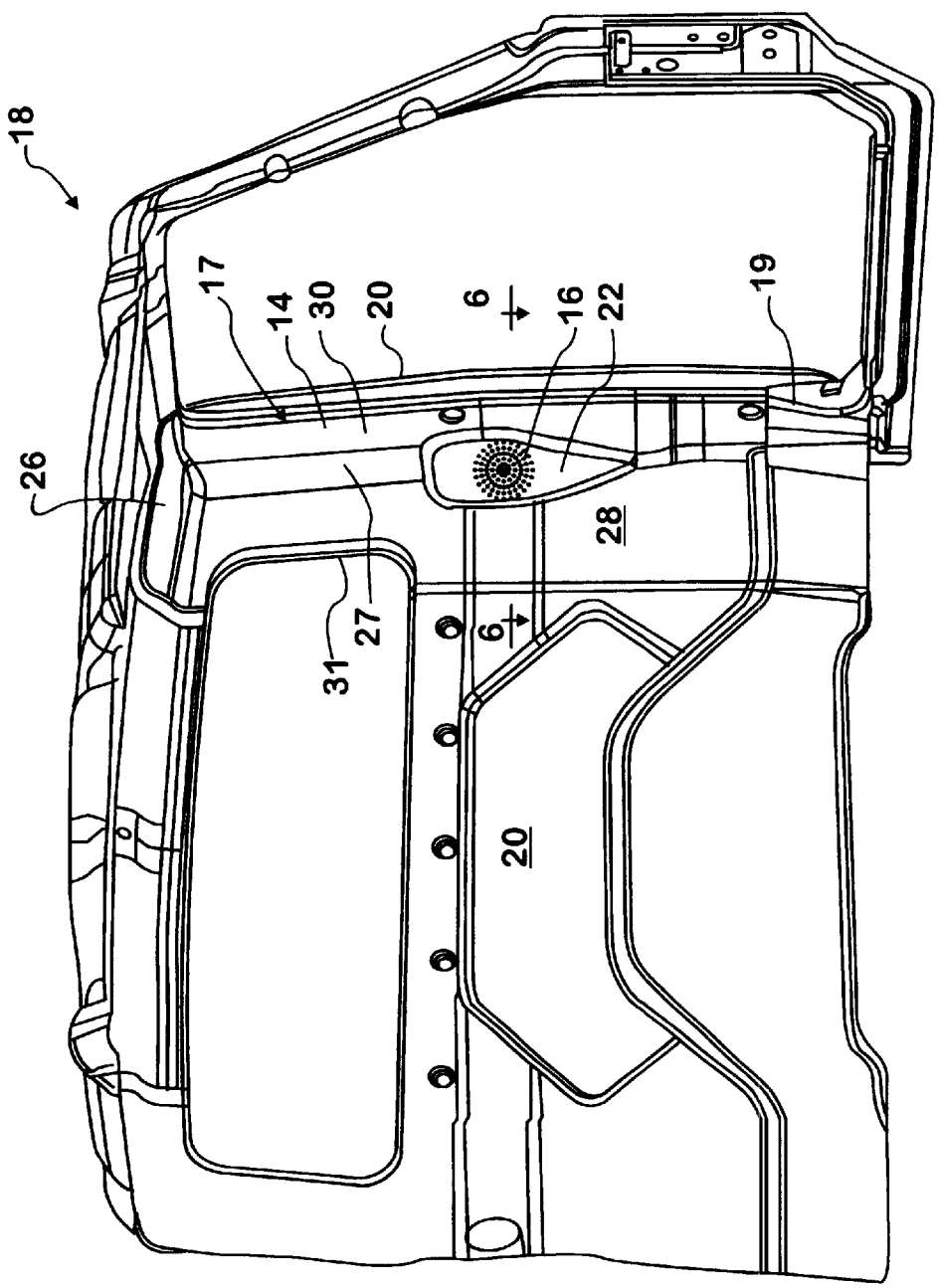
FIG. 2 is a perspective view of the rear wall of the operator cab illustrating positioning of a monolithic panel and of a speaker along the "B" pillars of the cab.

FIG. 2 is a perspective view of a rear cab section 18 of cab 40, illustrating a monolithic corner panel 14 nestled into a corner area defined within rear cab section 18 by metal framing and sheet metal shell 20. Monolithic corner panel 14 is a multifaceted molding, with its front major surface 17 broken into a plurality of subsidiary faces oriented to line the interior walls of operator's compartment 42. These include a back face 28, a side face 30, a roofing surface 26, a intermediate face 27 and an angled face 22. All of these faces have parallel counterparts on an opposed major surface which faces shell 20 and correspond to sections of the panel. It is through angled face 22 that speaker holes 16 are located. Angled face 22, and its parallel counterpart, interrupt the faces of the intermediate face 27 and do not conform to the shape of the underlying shell 20 and thereby, with the shell, define a void in which a speaker may be located between the monolithic corner panel and shell 20. This void is described in reference to FIG. 6, which is a cross-sectional view taken along section line 6—6 of FIG. 2. Monolithic corner panel 14 has a perimeter edge 31 which is shaped to avoid interfering with major cut outs from shell 20 such as doorways, the rear backlight and an area around the base of the B pillar 19, where a safety belt may be anchored.

Figure 3:
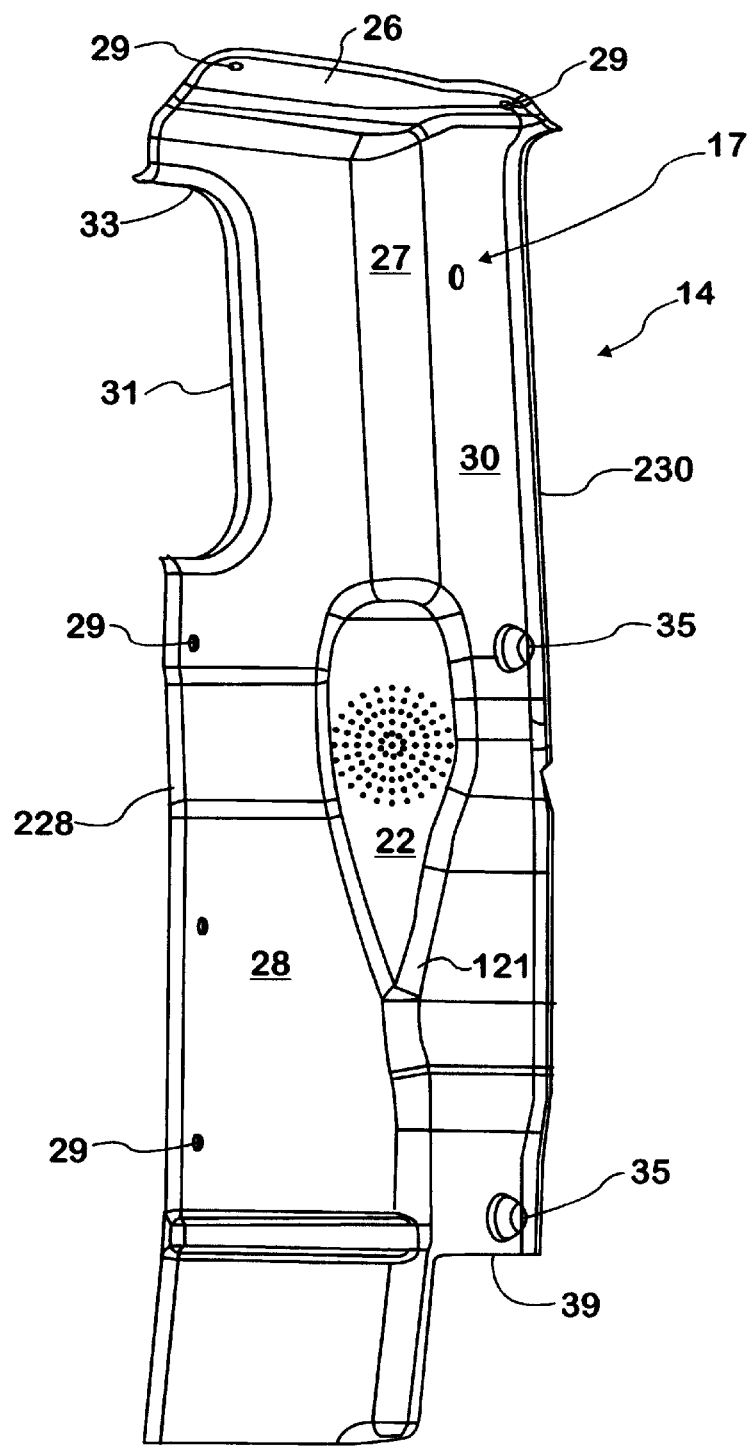
FIG. 3 is a perspective view of the interior face of the monolithic panel of the invention.

FIG. 3 illustrates in greater detail the front major surface 17 of monolithic corner panel 14. As discussed above, surface 17 is broken up into a plurality of sub-surfaces, each having a corresponding subsurface on a back major surface, illustrated in FIGS. 4 and 5. Panel 14 provides a plurality of attachments points 29, which are openings through which screws or other appropriate fasteners may be introduced to attach the panel to shell 20, or fastener connection points placed in or on shell 20. Two projecting brace points 35 extend from side panel 30. Perimeter 31 is broken by two notch sections 33 and 39, accommodating the backlight and opening an area at the base of the B pillar, respectively. Back face 28 and side face 30 extend at approximately right angles with respect to one another, forming the inner faces of an "L". Angled face 22 lies intermediate to back side 28 and side face 30, connecting the faces and extending partway from the bottom to the top of the monolithic corner panel 14. Angled face 22 extends at approximately a 45 degree angle from the back and side faces 28 and 30, and may be bordered by a sloped ring 121 between the angled face and the front major surface 17.

Monolithic corner panel 14 is molded from a single piece of thermoplastic. Front major surface 17 may be textured in the mold to give the surface a pleasant feel and appearance. The numerous borders between various surfaces help strengthen the panel. A plurality of speakers may be arrayed vertically along an interior rear corner of operator's cab 42 and each readily covered by a plurality of angled sections akin to section 222 and the provision of additional sets of apertures or holes 16. In a preferred embodiment holes 16 are drilled.

Figure 4:
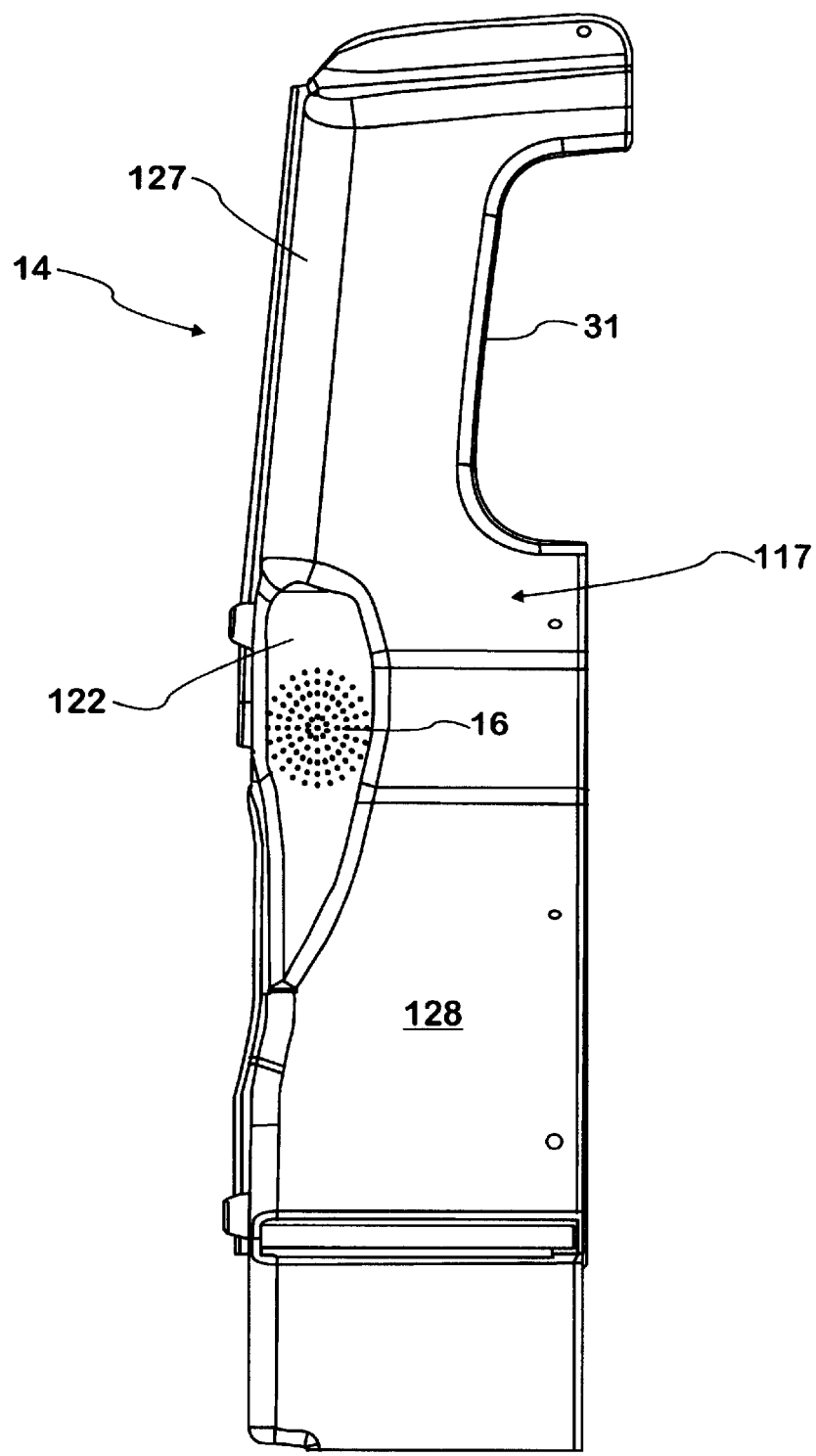
FIG. 4 is an elevation of the rear subsurface of the monolithic panel.
Figure 5:
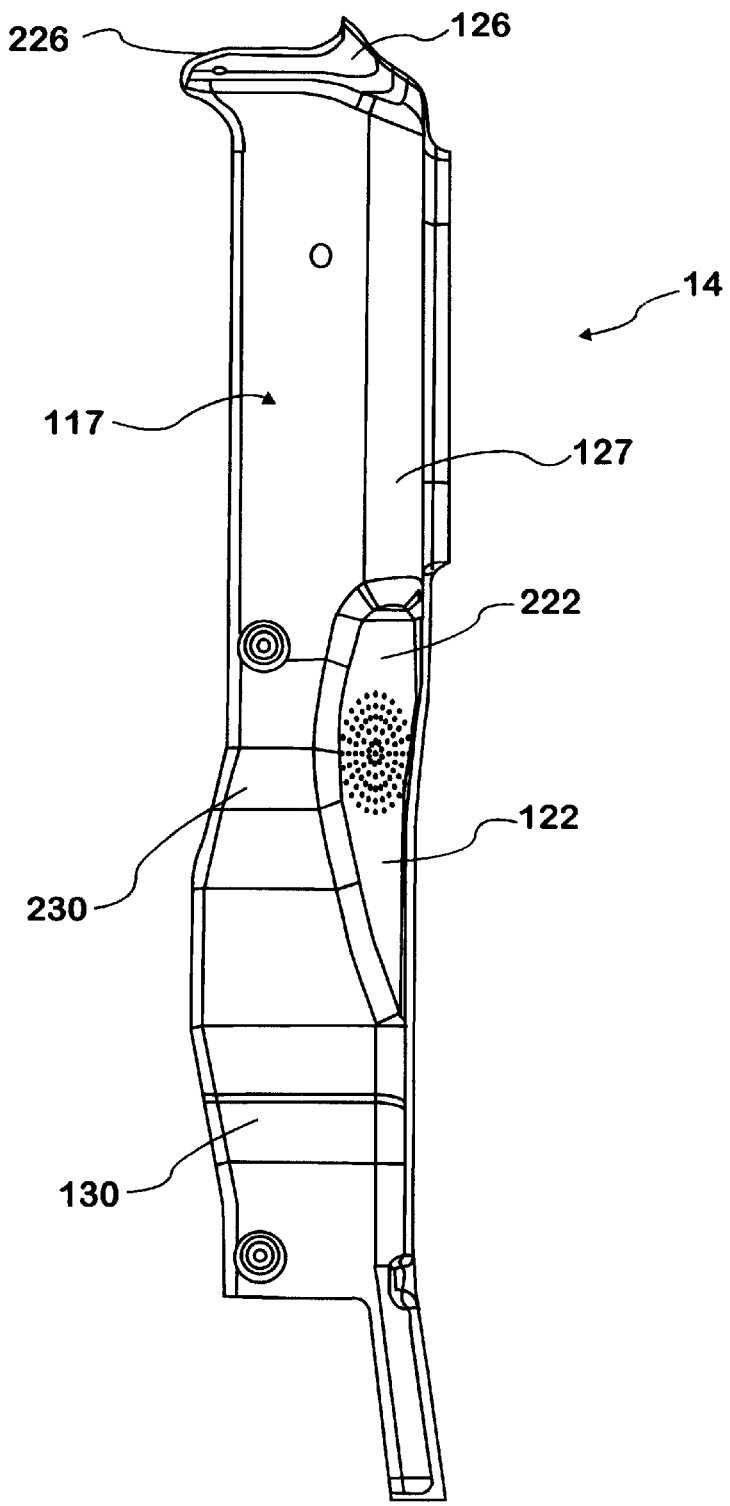
FIG. 5 is an elevation of the side subsurface of the monolithic panel.

FIGS. 4 and 5 illustrate a rear major surface 117 of the monolithic control panel 14 in elevation viewed from a rear back face 128, which parallels back face 28 on a back section 228. A rear angled face 122 is parallel to angled face 22 on an angled section 222, which is pierced by holes 16. A rear side face 130 is provided parallel to side face 30 on a vertically oriented side section 230 extending perpendicular to rear back face 128. An rear intermediate face 127 may be disposed between faces 128 and 130 extending vertically along the corner between faces 128 and 130 parallel to intermediate face 27. Intermediate face 27 provides a common vertex or spine to the back and side sections 228 and 230, which each depend from the spine along one edge. While only one set of holes 16 is shown, panel 14 may be readily modified to provide additional sets of holes for a plurality of speakers spaced vertically on the B pillar. A rear roof face 126 to the roof section 226 is similarly provided.

Figure 6:
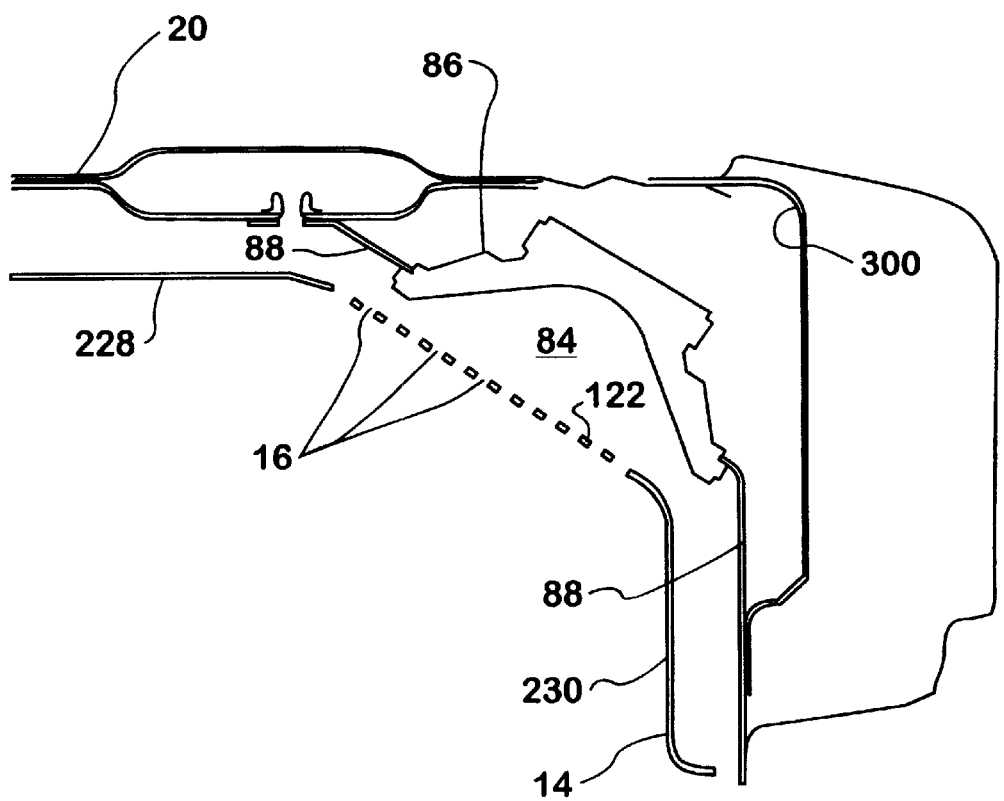
FIG. 6 is a cross sectional view taken along section line 6 in FIG. 2.

FIG. 6 is a cross sectional view taken along line 6—6 in FIG. 2, and illustrating a void 84 between a substantially right angled corner 300 defined by shell 20 and monolithic corner panel 14 adjacent rear angled face 122. Void 84 is provided by angled section 222 cutting across corner 300 and thereby leaving a gap between pane 14 and shell 20. This gap or void 84 provides space for a speaker 86 to be positioned opposite holes 16 through panel 14. Speaker 86 is mounted on brackets 88 and faces on an angle perpendicular to rear angled face 122 and inwardly into cabin 42 through holes 16.

The invention provides a vehicle interior panel of one piece molded construction, which simplifies vehicle assembly and enhances vehicle comfort by providing an integral speaker grill. Problems in color matching and in assuring a good fit between the different components are eliminated. The requirement for separate molds for the panel and the grill is also eliminated.

While the invention is shown in only one of its forms, it is not thus limited but is susceptible to various changes and modifications without departing from the spirit and scope of the invention.

What is claimed is:

1. A vehicle cab, comprising:
    a B pillar;
    a shell defining at least a first rear interior corner adjacent the cab B pillar;
    a monolithic interior panel having first and second mutually perpendicular, vertically oriented sections extending from a common spine and bounded by a circumferential edge;
    the monolithic interior panel further having front and rear major surfaces extending over the first and second sections, the rear major surface and comprising at least two subsurfaces corresponding to the first and second sections and being shaped to nestle into the first rear interior corner of the vehicle cab;
    the front major surface of the monolithic body having a generally concave form;
    an angle section between the first and second vertical sections forming an indent relative to the rear major surface and leaving a void between the monolithic body and the interior corner of the vehicle cab when the monolithic interior panel is fitted into the rear interior corner; and
    a plurality of apertures through the angle section into the void.

2. A vehicle cab as set forth in claim 1, further comprising:
    a speaker mounted to the shell within the defined void and oriented to direct sound toward the plurality of apertures.

3. A vehicle cab as set forth in claim 2, further comprising:
    a backlight; and
    a notch in the circumferential edge shaped to fit around the an end section of the backlight.

4. A vehicle cab as set forth in claim 2, further comprising:
    a notch in the circumferential edge leaving open a base of the B pillar.

5. A molded product comprising:
    a main body formed of a monolithic sheet of thermoplastic;
    side and back sections of the main body extending at substantially right angles to one another and defining an upright orientation of the molded product;
    a central vertical spine between the side and back sections;
    an intermediate angled section interrupting the vertical spine and located between the side and back sections;
    front and rear major surfaces covering the main body; and
    a plurality of apertures through the intermediate angled section connecting the front and rear major surfaces.

6. A molded product as set forth in claim, 5 further comprising:
    a circumferential edge;
    a rectangular notch in the back section intermediate a top and a bottom of the main body; and
    a second notch at the bottom of the side section.

* * * * *